US008405924B2

(12) United States Patent
Annampedu

(10) Patent No.: US 8,405,924 B2
(45) Date of Patent: Mar. 26, 2013

(54) METHOD AND APPARATUS FOR IMPROVED ADDRESS MARK DETECTION

(75) Inventor: Viswanath Annampedu, Schnecksville, PA (US)

(73) Assignee: Agere Systems LLC, Allentown, PA (US)

( * ) Notice: Subject to any disclaimer, the term of this patent is extended or adjusted under 35 U.S.C. 154(b) by 1985 days.

(21) Appl. No.: 10/835,809

(22) Filed: Apr. 30, 2004

(65) Prior Publication Data

US 2005/0243455 A1 Nov. 3, 2005

(51) Int. Cl.
*G11B 5/09* (2006.01)
(52) U.S. Cl. ............. 360/51; 360/31; 360/46; 360/48; 360/53; 360/77.02
(58) Field of Classification Search .................. None
See application file for complete search history.

(56) References Cited

U.S. PATENT DOCUMENTS

| | | | | |
|---|---|---|---|---|
| 4,345,280 A * | 8/1982 | Blagaila et al. | ............. | 360/49 |
| 5,047,877 A * | 9/1991 | Herting | ............. | 360/51 |
| 5,231,545 A * | 7/1993 | Gold | ............. | 360/49 |
| 5,477,103 A * | 12/1995 | Romano et al. | ............. | 318/601 |
| 5,502,408 A * | 3/1996 | Scholz | ............. | 326/105 |
| 5,523,990 A * | 6/1996 | Chiba | ............. | 369/47.24 |
| 5,623,468 A * | 4/1997 | Takeda et al. | ............. | 369/47.21 |
| 5,642,243 A * | 6/1997 | Bliss | ............. | 360/51 |
| 5,706,265 A * | 1/1998 | Bang | ............. | 369/47.48 |
| 5,729,396 A * | 3/1998 | Dudley et al. | ............. | 360/51 |
| 5,825,568 A * | 10/1998 | Lee | ............. | 360/51 |
| 6,021,012 A * | 2/2000 | Bang | ............. | 360/51 |
| 6,023,386 A * | 2/2000 | Reed et al. | ............. | 360/51 |
| 6,078,452 A * | 6/2000 | Kittilson et al. | ............. | 360/51 |
| 6,108,151 A * | 8/2000 | Tuttle et al. | ............. | 360/51 |
| 6,115,199 A * | 9/2000 | Bang | ............. | 360/51 |
| 6,480,984 B1 * | 11/2002 | Aziz | ............. | 714/795 |
| 6,483,789 B1 * | 11/2002 | Kubota et al. | ............. | 369/53.16 |
| 6,680,807 B1 * | 1/2004 | She et al. | ............. | 360/51 |
| 6,738,205 B1 * | 5/2004 | Moran et al. | ............. | 360/17 |
| 6,754,019 B2 * | 6/2004 | Tokizono et al. | ............. | 360/53 |
| 6,813,108 B2 * | 11/2004 | Annampedu et al. | ............. | 360/51 |
| 6,876,511 B2 * | 4/2005 | Koyanagi | ............. | 360/75 |
| 6,943,981 B2 * | 9/2005 | Ehrlich | ............. | 360/78.14 |
| 2003/0095350 A1 * | 5/2003 | Annampedu et al. | ............. | 360/39 |

* cited by examiner

*Primary Examiner* — Dismery Mercedes
(74) *Attorney, Agent, or Firm* — Ryan, Mason & Lewis, LLP

(57) ABSTRACT

A method and apparatus are disclosed for detecting an address mark in a data stream having a preamble followed by the address mark. The end of the preamble is detected in the data stream, which is then used to open a window to search for the address mark. If the address mark is not detected during the window, the search for the address mark is restarted. The window can have a duration based on a length of the address mark. The address mark can be, for example, a servo address mark following a servo preamble or a read address mark following a read preamble. The preamble can have a 2T pattern and the preamble can be detected by determining if energy associated with a 2T frequency is greater than energy associated with a non-2T frequency. The end of the preamble can be performed by an EndOf2T detector that detects a break in an expected bit pattern.

18 Claims, 5 Drawing Sheets

METHOD AND APPARATUS FOR IMPROVED ADDRESS MARK DETECTION

FIELD OF THE INVENTION

The present invention relates generally to data detection techniques, and, more particularly, to the detection of address marks, such as servo or read address marks in a recording system.

BACKGROUND OF THE INVENTION

A read channel integrated circuit (IC) is one of the core electronic components in a modern hard disk drive. For example, in a magnetic recording system, a read channel converts and encodes data to enable the magnetic recording heads to write data to the disk drive and then read back the data accurately. The disks in a drive have many tracks on them and each track consists of mostly user or "read" data sectors as well as "servo" data sectors embedded between the read sectors. The information recorded in the servo sectors helps to position the magnetic recording head on track so that the information stored in the read sectors is retrieved properly.

When a disk drive is powered up, the magnetic recording head will try to locate a servo sector, during a servo search mode. In particular, the magnetic recording head will try to locate a servo preamble (i.e., a preamble pattern written at the servo frequency), that allows the recording system to recover the timing and gain of the written servo data. Once the search mode identifies a servo sector, the signal timing and gain information can be obtained from the known servo preamble pattern and the various servo data fields can be detected. When a disk drive is initialized, however, the magnetic head could reside over any portion of a read field or a servo field. Thus, finding the closest servo preamble is a challenging task.

The servo and read sectors typically both begin with the same known 2T preamble pattern. The read preamble is followed by a read address mark and encoded user data. The servo preamble is followed by a servo address mark and various servo data. The goal of the search mode is to first find the servo preamble field and then initiate "normal" servo operations. Normal mode servo operations will be successful only if the search mode properly finds the servo preamble field. If the search mode confuses a read preamble field for a servo preamble field, the normal mode of servo operations will not be successful, since there is no servo information following the read preamble. When normal mode operations improperly begin on a read preamble field, the servo address mark detection logic will continue looking for the address mark indefinitely or a servo address mark will be falsely identified in the user data field, thereby misdirecting the servo control circuitry.

A need therefore exists for a method and apparatus for restarting the search mode as soon as possible to start a new search for the servo preamble field, in the event that a read preamble is mistaken for a servo preamble.

SUMMARY OF THE INVENTION

Generally, a method and apparatus are provided for detecting an address mark in a data stream having a preamble followed by the address mark. The end of the preamble is detected in the data stream, which is then used to open a window to search for the address mark. If the address mark is not detected during the window, the search for the address mark is restarted. The window can have a duration based on a length of the address mark. The address mark can be, for example, a servo address mark following a servo preamble or a read address mark following a read preamble.

In one exemplary implementation, the preamble has a 2T pattern and the preamble is detected by determining if energy associated with a 2T frequency is greater than energy associated with a non-2T frequency. The end of the preamble can be performed, for example, by an EndOf2T detector that detects a break in an expected bit pattern.

A more complete understanding of the present invention, as well as further features and advantages of the present invention, will be obtained by reference to the following detailed description and drawings.

DETAILED DESCRIPTION

The present invention provides methods and apparatus for determining if the read preamble is mistaken for a servo preamble during the search mode. Once it is determined that the detected data is not a servo preamble, the search mode is reinitialized to start a new search for a servo preamble field 101. The present invention improves the servo address mark false detection rate and the servo address mark detection miss rate, especially when the read and servo fields are written at very similar frequencies. While the present invention is illustrated in the context of detecting servo address marks, the present invention can be applied for the detection of any address mark that follows a preamble field, including a read address mark, as would be apparent to a person of ordinary skill in the art.

Figure 1:
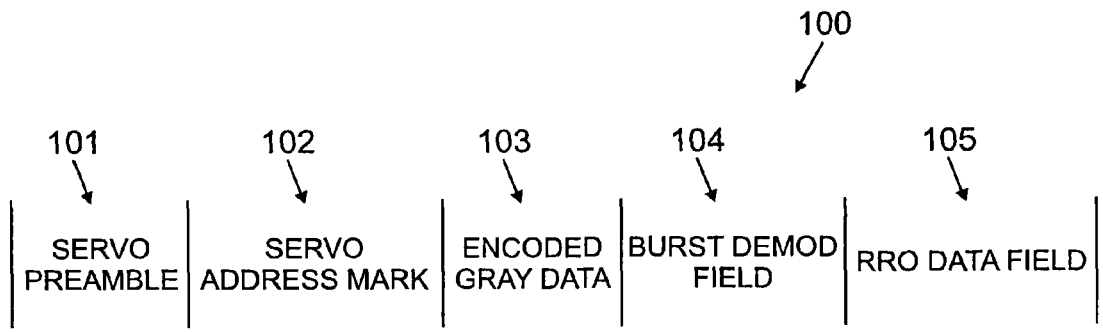
FIG. 1 illustrates an exemplary format of servo sector information.

FIG. 1 illustrates an exemplary format of servo sector information 100. As shown in FIG. 1, the exemplary servo sector information 100 comprises a preamble 101, such as a 2T preamble pattern, that allows the recording system to recover the timing and gain of the written servo data. The preamble 101 is typically followed by a servo address mark (SAM) 102 that is generally the same for all servo sectors and may then be followed by servo Gray data 103. The Gray data 103 is followed by one or more burst demodulation fields 104. The burst demodulation fields 104 are followed by an RRO field 105. The SAM 102 comprises some fixed number of bits. The Gray data 103 represents the track number/cylinder information and serves as a coarse positioning for the magnetic head. The burst demodulation field(s) 104 serves as a fine positioning system for the head to be on track. The RRO data 105 provides head positioning information that is finer than that provided by the Gray data 103 and more coarse than that provided by the burst demodulation field(s) 104.

Figure 2:
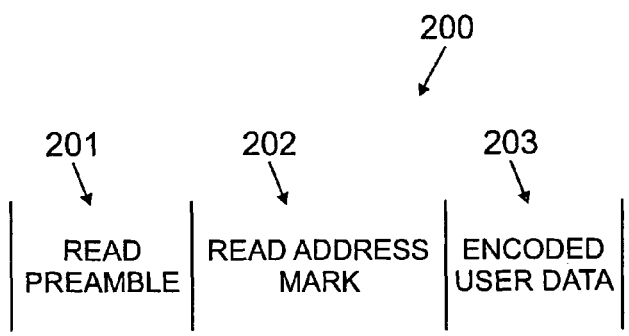
FIG. 2 illustrates an exemplary format of read sector information.

FIG. 2 illustrates an exemplary format of read sector information 200. As shown in FIG. 2, the exemplary read sector information 200 comprises a preamble 201, such as a 2T preamble pattern, followed by a read address mark 202 and encoded user data 203.

Figure 3:
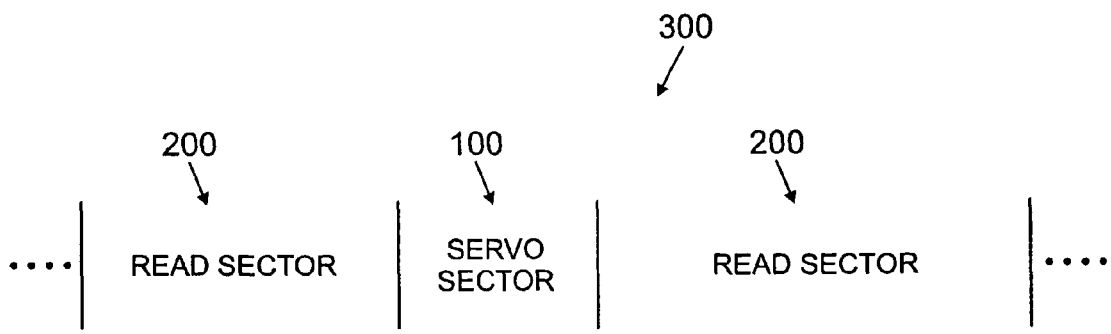
FIG. 3 illustrates a typical track format for recording servo and read sector information in a disk drive.

FIG. 3 illustrates a typical track format 300 for recording servo information 100 and read sector information 200 in a disk drive. In an embedded servo system, there are typically approximately around 60 to 100 servo sectors per track that consumes about 10% of surface area. The remaining 90% of the surface area is used for read sectors to store user data information. As shown in FIG. 3, the servo sectors 100 and read sectors 200 typically alternate on a given track, such that each servo sector 100 is typically preceded by a read sector 200 and followed by a read sector 200.

As previously indicated, when a disk drive is initialized (e.g., powered up), the magnetic recording head will try to locate a servo sector 100, during a servo search mode. In particular, the magnetic recording head will try to locate a servo preamble 101 (i.e., a preamble pattern written at the servo frequency). Once the search mode identifies a servo sector 100, then the normal mode of servo operations begin on that sector. During the normal mode of servo operations, the following sequence of servo operations are performed: (i) signal timing and gain acquisition based on the known servo preamble pattern 101; (ii) detection of the servo address mark 102; (iii) detection and decoding of the Gray coded data 103; (iv) burst demodulation processing on field 104; and (v) detection of the repeatable run out data 105.

If the read field is written at a very different frequency compared to the servo field, the preamble detection circuitry in the search mode will find the servo preamble properly and the probability of mistaking the read preamble for a servo preamble will be small. However, over certain radii of a magnetic disk the read and servo frequencies could be very close. Also, some applications, such as micro drives, call for very close frequencies for the read and servo sectors 200, 100. If the read and servo sectors 200, 100 are written at similar frequencies, then the preamble detection circuitry will falsely find the read preamble 201 as the servo preamble 101 more often and hence normal mode servo operations will be impaired.

Figure 4:
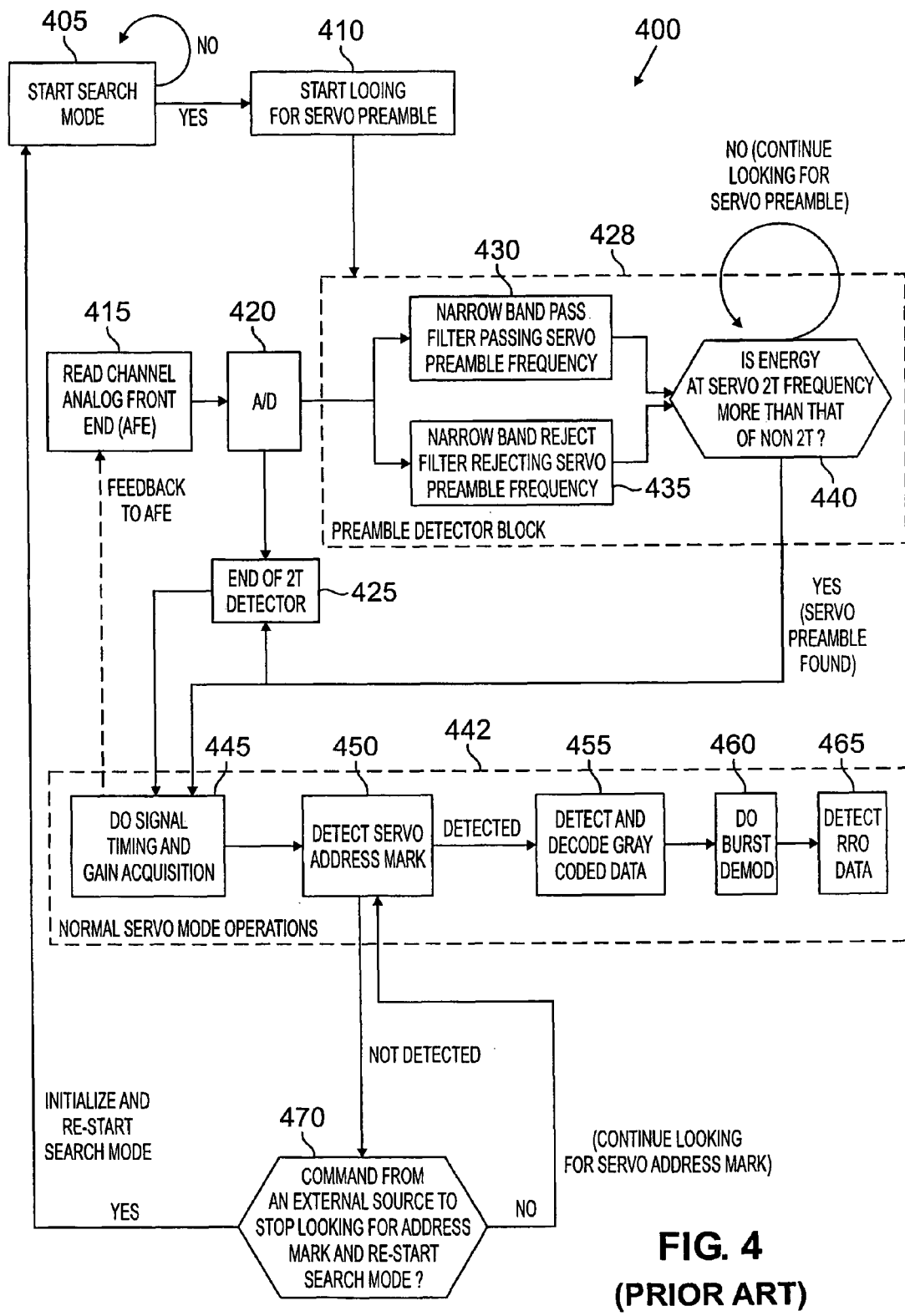
FIG. 4 is a flow chart describing a conventional servo address mark detection process incorporating a first type of search mode restart mechanism.

FIG. 4 is a flow chart describing a conventional servo address mark detection process 400 incorporating a first type of search mode restart mechanism. Generally, the servo address mark detection process 400 looks for a servo address mark until the read channel chip receives a command from an external controller device to stop looking for the servo address mark and restart the servo preamble search process.

As shown in FIG. 4, the search mode is initiated during step 405 and begins looking for a 2T preamble pattern written at the servo frequency corresponding to a servo sector during step 410. The servo address mark detection process 400 receives its input from the Read channel analog front end (AFE) 415 after digitization by an A/D converter 420. A preamble detection block 428 includes a narrow band pass filter 430 that passes signal energy only around the servo preamble frequency and a narrow band reject filter 435 that rejects the servo preamble energy and passes all non-2T energy. The servo preamble is detected at step 440 once the energy at the servo preamble frequency exceeds the non-2T component.

Once the servo preamble is detected at step 440, normal servo mode operations 442 are commenced. The first step 445 in a normal mode operation 442 is signal timing and gain acquisition based on the detected servo preamble 101. Timing and gain updates are fed back to the AFE 415, as shown in FIG. 4. After signal acquisition is done, the next step 450 is to find the servo address mark 102. If the servo address mark 102 is detected at step 450, normal operations (gray code detection 455, burst demodulation 460 and repeatable run out (RRO) data detection 465) are performed.

If the servo address mark 102 is not detected at step 450, the servo address mark detector 450 will continuously look for the address mark 102 until the read channel chip receives a command from an external controller device (not shown) during step 470 to stop looking for the servo address mark 102 and restart the servo preamble search process.

The search mode restart mechanism of the servo address mark detection process 400 thus depends on an external source for restarting. Thus, the external control circuit may not know how long to look for a servo address mark 102 and thus could result in false address mark detection and wasting time in looking for an address mark in the wrong place.

The EndOf2T detector block 425 shown in FIG. 4 is discussed below in conjunction with FIG. 6.

Figure 5:
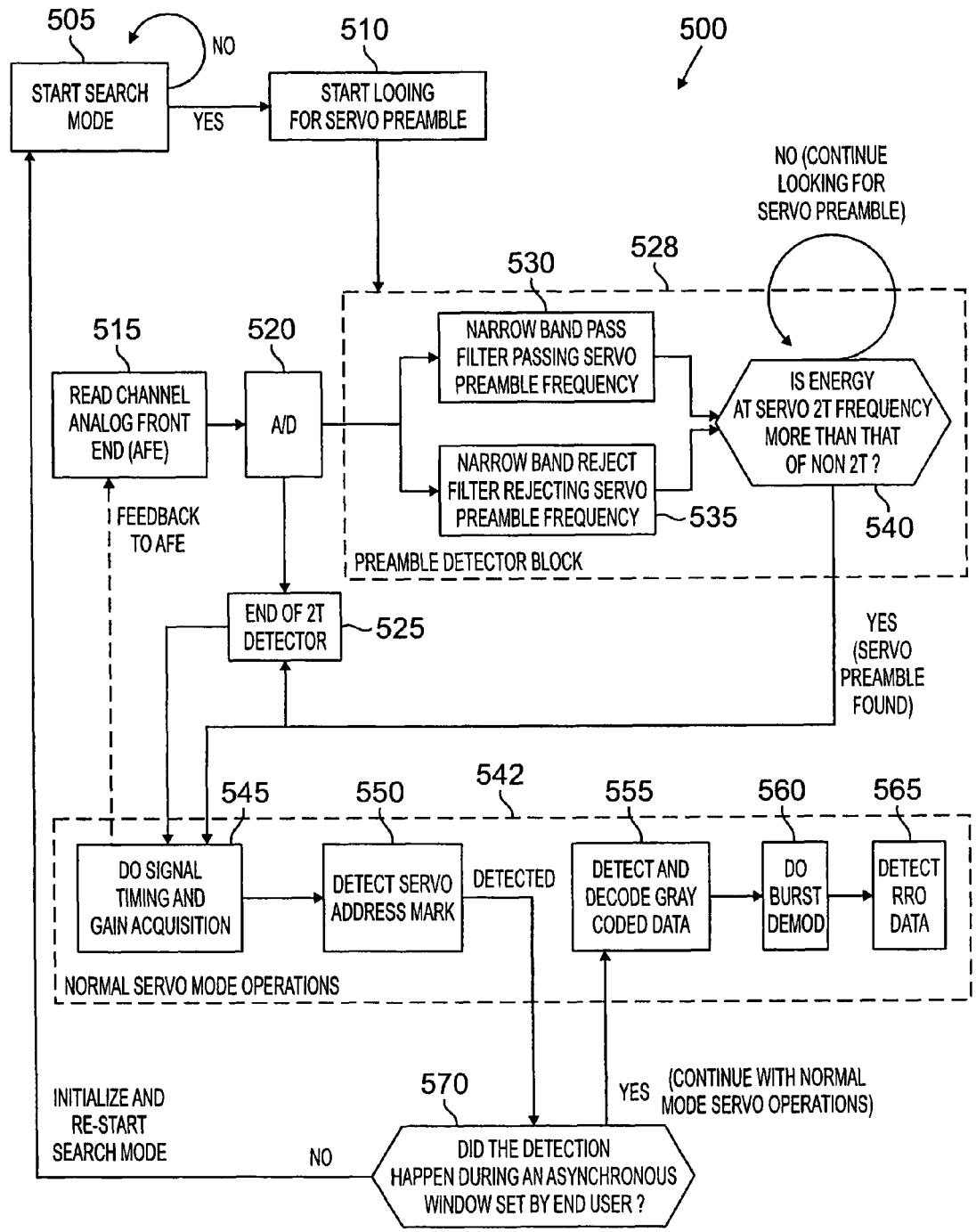
FIG. 5 is a flow chart describing a conventional servo address mark detection process incorporating a second type of search mode restart mechanism.

FIG. 5 is a flow chart describing a conventional servo address mark detection process 500 incorporating a second type of search mode restart mechanism. Generally, the servo address mark detection process 500 looks for a servo address mark within an asynchronous window of programmable duration and will restart the search mode if the servo address mark is not detected during the specified asynchronous window. The conventional servo address mark detection process 500 of FIG. 5 is similar to the servo address mark detection process 400 of FIG. 4 through the acquisition of timing and gain during step 545.

The servo address mark detection process 500 of FIG. 5 differs from the servo address mark detection process 400 of FIG. 4 only in the manner in which the servo address mark detection 550 is performed and the search mode is restarted upon a failure to detect the servo address mark 102. In particular, the servo address mark detection process 500 qualifies the servo preamble detection by putting a constraint that the servo address mark detection 550 must happen during the "asynchronous" window set by the end user.

Thus, as shown in FIG. 5, the servo address mark detection process 500 will restart the search mode during step 570 if the servo address mark detection does not happen during the asynchronous window. The performance of the servo address mark detection process 500 is not significantly better than the performance of the servo address mark detection process 400, due to the asynchronous nature of the window. The locations of the servo sector and the corresponding location of the servo address mark are not known. Thus, there is no reliable way to place a window around the servo address mark area. In fact, the servo address mark detection process 500 may never find the servo address mark 102 within the programmed window.

The purpose of the asynchronous window is to qualify the servo address mark detection 550. Thus, the size of the window should be reasonably tight. For example, a window of relatively large duration is not helpful because a large window increases the possibility of finding a false servo address mark. Generally, the smaller the duration of the qualification window, the better the false detection rate. However, it is a challenge to position a narrow asynchronous window over the servo preamble area.

Figure 6:
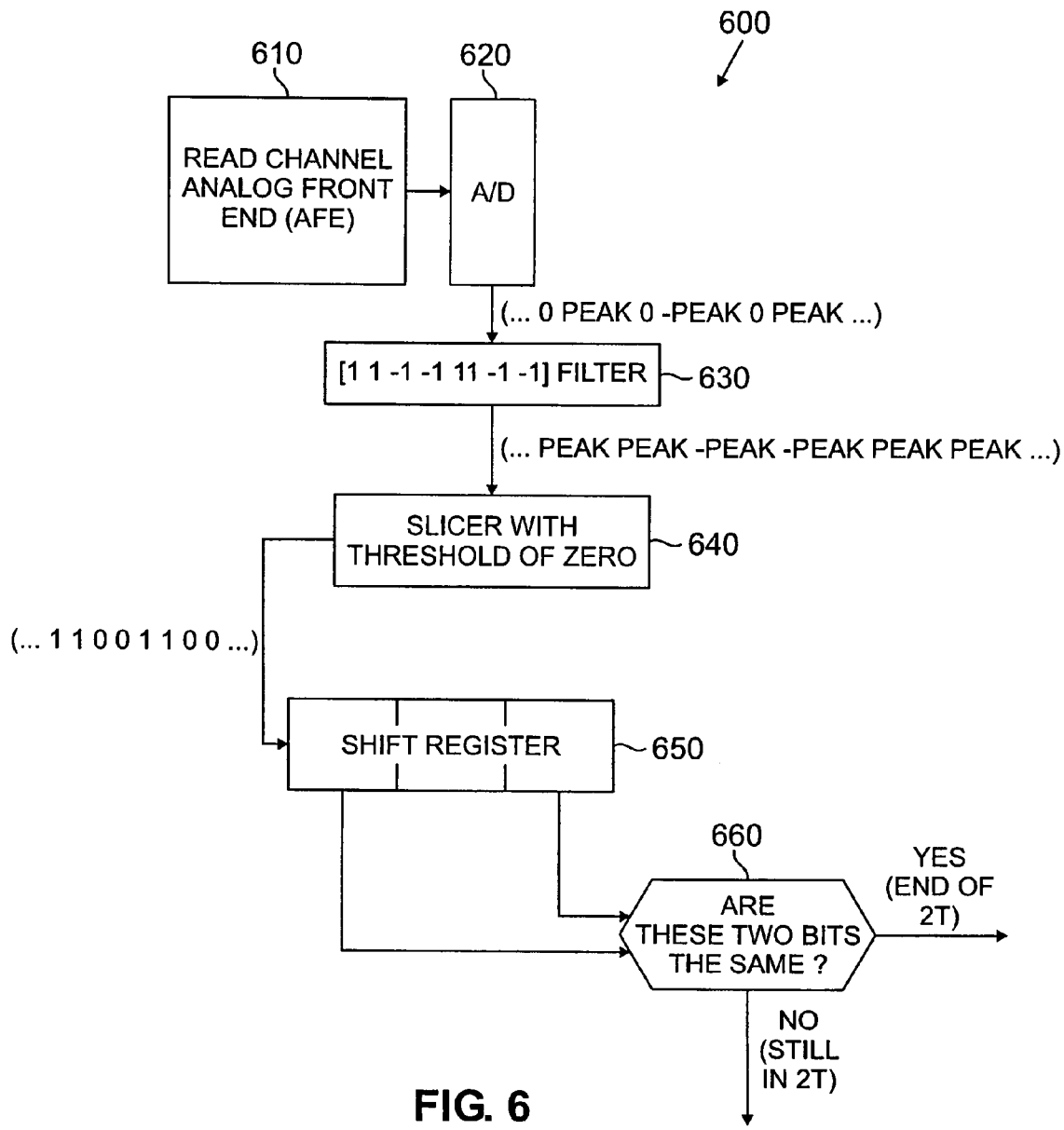
FIG. 6 is a schematic block diagram of a conventional EndOf2T detector.

FIG. 6 is a schematic block diagram of a conventional EndOf2T detector 600. As previously indicated, a servo sector 100 begins with a known 2T servo preamble pattern 101 followed by a servo address mark 102. Also, once a preamble pattern is detected by the search mode, signal timing and gain acquisition will be performed using the preamble field. Signal timing and gain acquisition over a preamble field is referred to as the "acquire mode."

Since the data (11001100 . . . ) is known over a preamble field, conventional systems employ efficient decision directed algorithms to acquire the gain and timing information over this field and try to make use of all of the preamble bits for this acquisition. For this purpose, conventional systems employ an "EndOf2T" detector 600 to detect the end of the 2T preamble field. An acquire mode algorithm for timing and gain acquisition is performed over the preamble field until the end of the preamble is detected by the EndOf2T detector 600.

As shown in FIG. 6, the EndOf2T detector 600 receives its input from the Read channel analog front end (AFE) 610 after digitization by an A/D converter 620. During the acquire mode, the AFE 610 would have acquired proper gain and timing (phase and frequency) of the input readback signal from the magnetic head. The A/D output during a properly acquired preamble pattern will be " . . . 0 peak 0-peak 0 peak 0-peak . . . ." The peak could be a value of 20 for example. This A/D output is filtered at stage 630 with a {1, 1, −1, −1, 1, 1, −1, −1} filter. The output of the filter will be " . . . peak peak-peak-peak peak peak . . . " This signal will be sliced during step 640 (with a threshold of 0) and passed through a shift register 650.

If the EndOf2T detector 600 is on a preamble, the sliced output will be { . . . 1, 1, 0, 0, 1, 1, 0, 0, . . . }. The break in this pattern sequence indicates that 2T has ended, as illustrated in FIG. 6. Thus, as shown in FIG. 6, when the first and third bits of the 3 bit shift register 650 become the same, as detected during step 660, the preamble signal has ended.

As discussed hereinafter, the present invention makes use of the EndOf2T information from the EndOf2T detector 600 to determine whether the search mode found a preamble field corresponding to a servo sector and to initialize and restart the search mode to restart looking for a servo preamble field again if a read preamble was incorrectly found.

The servo address mark 102 is known to follow the servo preamble field 101. The present invention recognizes that the servo address mark detection is expected to happen shortly after the end of preamble detection by the EndOf2T detector 600. Thus, a servo address mark detection process 700 in accordance with the present invention, discussed below in conjunction with FIG. 7, opens a window of duration L channel bit periods immediately after the detection of the end of the preamble field by the EndOf2T detector 600. L will span the number of bits used for the servo address mark and will also account for processing delays in the servo address mark detector 700 and tolerances for all other implementation delays.

If the servo address mark 102 is detected within this window it indicates that the preamble found by the search mode most likely corresponds to a servo sector 100. If the servo address mark 102 is not found during this window, it indicates the possibility of the search mode mistaking the read preamble 202 for a servo preamble 102. In this case, the servo address mark detection process 700 directs the search mode logic to initialize and restart the servo preamble search process. This servo preamble search and restart procedure will continue until a successful detection of the servo address mark 102 happens within the window based on information from the EndOf2T detector 600.

Figure 7:
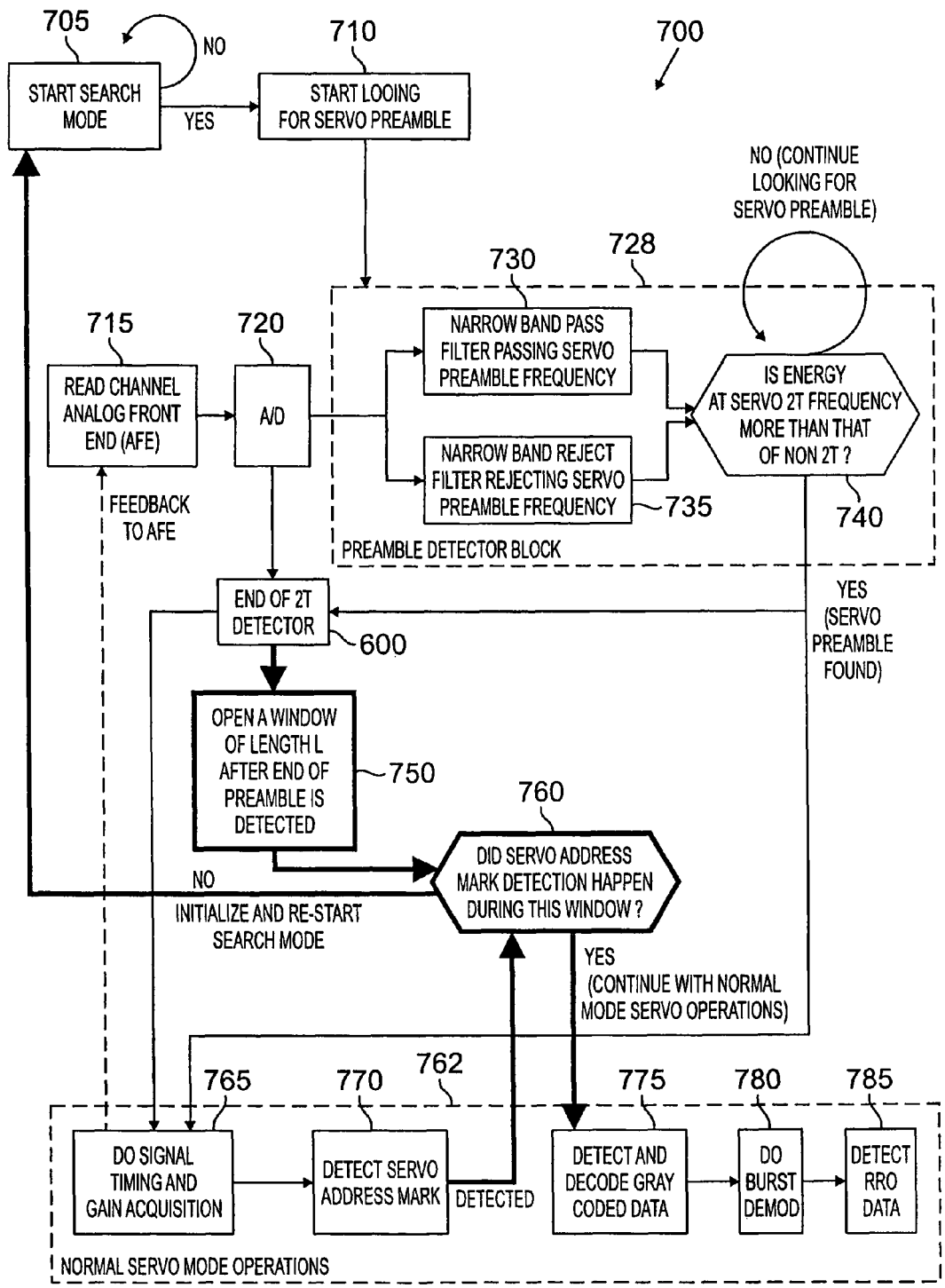
FIG. 7 is a flow chart describing an exemplary search mode process incorporating features of the present invention.

FIG. 7 is a flow chart describing a servo address mark detection process 700 incorporating features of the present invention. As shown in FIG. 7, the servo address mark detection process 700 is similar to the servo address mark detection processes 400, 500 of FIGS. 4 and 5 through the detection of the servo preamble during step 740. Once the servo preamble is detected during step 740, the EndOf2T detector 600 begins searching for the end of the 2T preamble period. Thereafter, upon detection of the end of the preamble field by the EndOf2T detector 600, a window is opened during step 750 of duration L bit periods during which the servo address mark must be detected.

If the servo address mark is not detected during step 760, a read preamble was most likely encountered and a restart command is issued to the search mode state machine that initializes and starts a new search for a servo preamble 101. If the servo address mark is detected in the window during step 760, on the other hand, the preamble located by the search mode logic likely corresponds to a servo preamble 101 and thus the remaining normal servo mode operations 762 continue, in the manner described above.

As previously indicated, the windowing technique based on the EndOf2T detector 600 can be applied to any address mark detection scheme (not necessarily limited to servo address mark detection) to efficiently detect any address mark following directly after a preamble field.

The disclosed servo search mode restart mechanism described herein will improve the servo address mark false detection rate and the servo address mark detection miss rate, especially when the read and servo fields are written at very similar frequencies. Among other benefits, the disclosed servo search mode restart mechanism does not require any external controls to restart the search mode. In addition, the window placement for the servo address mark detection qualification is automatic since it is based on information directly from the EndOf2T detector 600 and does not need any input from an end user.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for detecting an address mark in a data stream having a preamble followed by said address mark, comprising the steps of:
   detecting an end of said preamble; and
   opening a window to search for said address mark based on the detection of said end of said preamble, wherein said window has a given duration based on a length of said address mark.

2. The method of claim 1, further comprising the step of detecting said preamble.

3. The method of claim 2, wherein said preamble has a 2T pattern and wherein said step of detecting said preamble further comprises the step of determining if energy associated with a 2T frequency is greater than energy associated with a non-2T frequency.

4. The method of claim 1, wherein said preamble has a 2T pattern and said step of detecting said end of said preamble is performed by an EndOf2T detector.

5. The method of claim 4, wherein said EndOf2T detector detects a break in an expected bit pattern.

6. The method of claim 1, wherein said address mark is a servo address mark following a servo preamble.

7. The method of claim 1, wherein said address mark is a read address mark following a read preamble.

8. The method of claim 1, further comprising the step of restarting said search for said address mark if said address mark is not detected during said window.

9. An apparatus for detecting an address mark in a data stream having a preamble followed by said address mark, comprising:
- an end of preamble detector; and
- an address mark detector for searching a window of said data stream for said address mark, wherein said window is started based on said end of preamble detector, wherein said window has a given duration based on a length of said address mark.

10. The apparatus of claim 9, further comprising a preamble detector.

11. The apparatus of claim 10, wherein said preamble has a 2T pattern and wherein said preamble detector determines if energy associated with a 2T frequency is greater than energy associated with a non-2T frequency.

12. The apparatus of claim 9, wherein said preamble has a 2T pattern and said end of preamble detector is an EndOf2T detector.

13. The apparatus of claim 12, wherein said EndOf2T detector detects a break in an expected bit pattern.

14. The apparatus of claim 9, wherein said address mark is a servo address mark following a servo preamble.

15. The apparatus of claim 9, wherein said address mark is a read address mark following a read preamble.

16. The apparatus of claim 9, wherein said address mark detector restarts said search for said address mark if said address mark is not detected during said window.

17. An apparatus for detecting an address mark in a data stream having a preamble followed by said address ark, comprising:
- a memory; and
- a processor, coupled to said memory, said processor configured to:
  - detect an end of said preamble; and
  - open a window to search for said address mark based on the detection of said end of said preamble, wherein said window has a given duration based on a length of said address mark.

18. The apparatus of claim 17, wherein said processor is further configured to restart said search for said address mark if said address mark is not detected during said window.

* * * * *